United States Patent
Ramu et al.

(10) Patent No.: US 10,445,298 B2
(45) Date of Patent: Oct. 15, 2019

(54) VAULT TO OBJECT STORE

(71) Applicant: Actifio, Inc., Waltham, MA (US)

(72) Inventors: Ashok Thittapullimadam Ramu, Lexington, MA (US); Boris Vladimir Protopopov, Acton, MA (US); Yong-Min Chen, Wellesley, MA (US); Dongjun Sun, Acton, MA (US); Tracy Melbourne Taylor, Concord, MA (US); Yeganjaiah Gottemukkula, Lexington, MA (US); Bhargava Kumar Kancherla, Hyderabad (IN)

(73) Assignee: Actifio, Inc., Waltham, MA (US)

( * ) Notice: Subject to any disclaimer, the term of this patent is extended or adjusted under 35 U.S.C. 154(b) by 281 days.

(21) Appl. No.: 15/158,259

(22) Filed: May 18, 2016

(65) Prior Publication Data

US 2017/0337109 A1 Nov. 23, 2017

(51) Int. Cl.
*G06F 17/30* (2006.01)
*G06F 16/182* (2019.01)
*G06F 11/14* (2006.01)
*G06F 16/11* (2019.01)

(52) U.S. Cl.
CPC ...... *G06F 16/1844* (2019.01); *G06F 11/1448* (2013.01); *G06F 11/1453* (2013.01); *G06F 11/1456* (2013.01); *G06F 16/128* (2019.01); *G06F 2201/84* (2013.01)

(58) Field of Classification Search
None
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |
| 5,535,381 A | 7/1996 | Kopper |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Alex Gofman
(74) *Attorney, Agent, or Firm* — Wilmer Cutler Pickering Hale and Dorr LLP

(57) ABSTRACT

Systems and methods of enabling a service level agreement to specify interactions between an application and a remotely located object store that manages data as objects. A computing device receives data associated with a request to write application data to an object store according to a schedule, wherein the data is file system data. The computing device creates a snapshot associated with the requested application at a snapshot pool, and transmits instructions to a cloud formatting engine to create a virtual disk at a storage pool associated with an object store. The computing device copies the snapshot from the snapshot pool to the virtual disk, the snapshot comprising file system data and transmits instructions to the cloud formatting engine to convert the data associated with the first snapshot into an object, and move the object from the virtual disk to the object store.

20 Claims, 7 Drawing Sheets

(56) References Cited

U.S. PATENT DOCUMENTS

| | | | |
|---|---|---|---|
| 5,819,292 | A | 10/1998 | Hitz et al. |
| 5,828,876 | A | 10/1998 | Fish et al. |
| 5,857,208 | A | 1/1999 | Ofek |
| 5,963,962 | A | 10/1999 | Hitz et al. |
| 6,065,018 | A | 5/2000 | Beier et al. |
| 6,081,875 | A | 6/2000 | Clifton et al. |
| 6,119,208 | A | 9/2000 | White et al. |
| 6,131,148 | A | 10/2000 | West et al. |
| 6,148,412 | A | 11/2000 | Cannon et al. |
| 6,163,856 | A | 12/2000 | Dion et al. |
| 6,192,444 | B1 | 2/2001 | White et al. |
| 6,199,146 | B1 | 3/2001 | Pence |
| 6,202,071 | B1 | 3/2001 | Keene |
| 6,212,531 | B1 | 4/2001 | Blea et al. |
| 6,226,759 | B1 | 5/2001 | Miller et al. |
| 6,269,381 | B1 | 7/2001 | St. Pierre et al. |
| 6,269,431 | B1 | 7/2001 | Dunham |
| 6,324,548 | B1 | 11/2001 | Sorenson |
| 6,330,614 | B1 | 12/2001 | Aggarwal et al. |
| 6,434,681 | B1 | 8/2002 | Armangau |
| 6,460,055 | B1 | 10/2002 | Midgley et al. |
| 6,484,186 | B1 | 11/2002 | Rungta |
| 6,487,561 | B1 | 11/2002 | Ofek et al. |
| 6,557,089 | B1 | 4/2003 | Reed et al. |
| 6,625,704 | B2 | 9/2003 | Winokur |
| 6,654,772 | B1 | 11/2003 | Crow et al. |
| 6,654,912 | B1 | 11/2003 | Viswanathan et al. |
| 6,665,815 | B1 | 12/2003 | Goldstein et al. |
| 6,668,264 | B1 | 12/2003 | Patterson et al. |
| 6,772,302 | B1 | 8/2004 | Thompson |
| 6,779,094 | B2 | 8/2004 | Selkirk et al. |
| 6,823,336 | B1 | 11/2004 | Srinivasan et al. |
| 6,823,436 | B2 | 11/2004 | Krishnamurthy |
| 6,850,929 | B2 | 2/2005 | Chang et al. |
| 6,898,688 | B2 | 5/2005 | Martin et al. |
| 6,915,397 | B2 | 7/2005 | Lubbers et al. |
| 6,928,526 | B1 | 8/2005 | Zhu et al. |
| 6,948,039 | B2 | 9/2005 | Biessener et al. |
| 6,957,362 | B2 | 10/2005 | Armangau |
| 7,072,916 | B1 | 7/2006 | Lewis et al. |
| 7,143,251 | B1 | 11/2006 | Patterson |
| 7,222,194 | B2 | 5/2007 | Kano et al. |
| 7,325,111 | B1 | 1/2008 | Jiang |
| 7,346,623 | B2 | 3/2008 | Prahlad et al. |
| 7,386,695 | B2 | 6/2008 | Fuente |
| 7,428,657 | B2 | 9/2008 | Yamasaki |
| 7,647,355 | B2 | 1/2010 | Best et al. |
| 7,689,633 | B1 | 3/2010 | Li et al. |
| 7,707,184 | B1 | 4/2010 | Zhang et al. |
| 7,814,128 | B2 | 10/2010 | Silvers et al. |
| 7,937,547 | B2 | 5/2011 | Liu et al. |
| 8,037,032 | B2 | 10/2011 | Pershin et al. |
| 8,139,575 | B2 | 3/2012 | Biran et al. |
| 8,150,808 | B2 | 4/2012 | Zha et al. |
| 8,180,740 | B1 | 5/2012 | Stager et al. |
| 8,180,742 | B2 | 5/2012 | Claudatos et al. |
| 8,299,944 | B2 | 10/2012 | Provenzano |
| 8,407,191 | B1 | 3/2013 | Nanda |
| 8,706,833 | B1 | 4/2014 | Bergant et al. |
| 8,788,769 | B2 | 7/2014 | Abercrombie et al. |
| 8,818,951 | B1* | 8/2014 | Muntz ............ G06F 17/30088 707/639 |
| 8,924,425 | B1* | 12/2014 | Pandey ................. G06F 17/303 707/792 |
| 9,098,432 | B1 | 8/2015 | Bachu et al. |
| 2002/0129214 | A1 | 9/2002 | Sarkar |
| 2003/0101321 | A1 | 5/2003 | Ohran |
| 2003/0140070 | A1 | 7/2003 | Kaczmarski et al. |
| 2004/0199570 | A1 | 10/2004 | Terao |
| 2005/0066095 | A1 | 3/2005 | Mullick et al. |
| 2005/0165794 | A1 | 7/2005 | Mosescu |
| 2006/0074945 | A1 | 4/2006 | Mori |
| 2009/0216816 | A1* | 8/2009 | Basler ................. G06F 11/1464 |
| 2009/0222496 | A1 | 9/2009 | Liu et al. |
| 2010/0228919 | A1* | 9/2010 | Stabrawa ............ G06F 11/1456 711/120 |
| 2011/0145494 | A1* | 6/2011 | Mitsuma ................. G06F 3/061 711/111 |
| 2011/0258161 | A1 | 10/2011 | Constantinescu et al. |
| 2012/0123999 | A1 | 5/2012 | Ashutosh et al. |
| 2012/0124307 | A1* | 5/2012 | Ashutosh ............ G06F 11/1451 711/162 |
| 2013/0110779 | A1* | 5/2013 | Taylor ................. G06F 16/1844 707/624 |

OTHER PUBLICATIONS

American Megatrends, Inc., "StorTrends/ManageTrends® (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring Is A Lot More Than Just Safe," Computer Technology Review, No Month Listed 2000 (pp. 55-57).

Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

Edwards et al., "FlexVol: Flexible, Efficient File Volume Virtualization in WAFL," Usenix Association, Usenix '08: 2008 Usenix Annual Technical Conference, No Month Listed 2008 (pp. 129-142).

You et al., "Deep Store: An Archival Storage System Architecture," Proceedings of the 21st International Conference on Data Engineering, No Month Listed 2005 (12 pages).

Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).

EMC, "Backup of Oracle in EMC Symmetrix Environments with EMC NetWorker PowerSnap," Aug. 2008 (25 pages).

Zhu et al., "Avoiding the Disk Bottleneck in the Data Domain Deduplication File System," Proceedings of the 6th Usenix Con-

(56) References Cited

OTHER PUBLICATIONS ference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, filed Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>]Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).

Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).

(56) References Cited

OTHER PUBLICATIONS

Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade The European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, 2008 (29 pages).
Mesnier et al., "Object-Based Storage," IEEE Communications Magazine, Aug. 2003 (pp. 84-90).

(56) References Cited

OTHER PUBLICATIONS

Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror® File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, filed Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
No Author Listed, "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap™ Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
VMware, "VMware Consolidated Backup: Best Practices and Deployment Considerations for SAN Environments," retrieved online at [URL:<<https://web.archive.org/web/20080804070141/http://www.vmware.com/files/pdf/vcb_best_ practices>>] No Month Listed 2007 (39 pages).
Wolf, "VM Backup Bliss? The State of VM Data Protection in the Enterprise," Burton Group, Midvale, Utah, Aug. 1, 2007 (45 pages).

* cited by examiner

VAULT TO OBJECT STORE

TECHNICAL FIELD

This invention relates generally to data management, data protection, disaster recovery and business continuity. More specifically, this invention relates to a system and method for reading and writing data to object storage.

BACKGROUND

Copy data systems (e.g., Actifio copy data systems such as CDS and Sky) typically use block input/output (I/O) when replicating copy data to a remote target CDS using asynchronous deduplication and dedup replication. Block I/O usually includes writing and reading data that is organized as logical blocks (e.g., 512 byte blocks). Block I/O maintains an address for the logical blocks, but does not keep hierarchical information about data objects associated with the logical blocks. In contrast, object data stores organize data as objects and tracks hierarchical relationships between data objects. Object stores offered by both public and private cloud providers offer cost effective means for long term data retention (e.g., 7 years or more). The reliability of these object stores make them effective replacements to the existing tape technology. As existing copy data systems use block I/O to replicate data to a remote target, existing copy data systems do not have the capability to read or write from an object data store at a remote target.

SUMMARY OF THE INVENTION

In accordance with the disclosed subject matter, systems, methods, and non-transitory computer-readable media are provided for enabling a service level agreement to specify interactions between an application and a remotely located object store that manages data as objects.

In some embodiments, the disclosed subject matter includes a method for receiving first data associated with a first request to write application data to an object store according to a first schedule, wherein the first data is file system data. In some embodiments, a computing device creates a first snapshot associated with the first requested application at a snapshot pool. In some embodiments, the computing device transmits first instructions to a cloud formatting engine to create a first virtual disk at a storage pool associated with an object store, the first disk being structured to accept file system data. In some embodiments, the computing device copies the first snapshot from the snapshot pool to the first virtual disk, the first snapshot comprising file system data. In some embodiments, the computing device transmits instructions to the cloud formatting engine to convert the data associated with the first snapshot into an object, and move the object from the first virtual disk to the object store, thereby enabling a service level agreement to specify interactions between an application and a remotely located object store that manages data as objects.

In some embodiments, the computing device receives second data associated with a second request from a requesting application to read application data from the object store at a first time. In some embodiments, the computing device transmits second instructions to the cloud formatting engine to mount a second snapshot, the snapshot associated with the second data, and present the second application image as a second virtual disk on the storage pool associated with the object store. In some embodiments, the computing device presents the second virtual disk to the requesting application at a second time.

In some embodiments, the computing device provides a scratch disk to cache writes associated with the second snapshot, the cache writes including identification information associated with the second snapshot. In some embodiments, the difference between the first time and the second time is approximately 2 minutes. In some embodiments, the object store is associated with a long-term storage of the application data. In some embodiments, the computing device creates a directory structure associated with the object store, the directory structure comprising a logical representation of the object store. In some embodiments, the first instructions include data associated with the directory structure.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Systems and methods described herein enable copy data systems to read and write from an object data store. Service level agreements (SLAs) can be configured to include policies that schedule replication of data to object storage (e.g., from snapshot storage to object storage). In some embodiments, the systems and methods described herein treat the object storage as another storage tier and the copy data system manages the metadata for images in the object store. Some embodiments also include a desktop that is used to manage both a copy data appliance and to retrieve or mount images from the object store. The systems and methods described herein also allow multiple vault pools each backed by an associated object store. For example, end-user can choose to move one set of applications to a first storage, (e.g., Google Nearline), and another set of applications to a second storage, (e.g., Amazon S3), all controlled by an SLA that governs the application.

Figure 1:
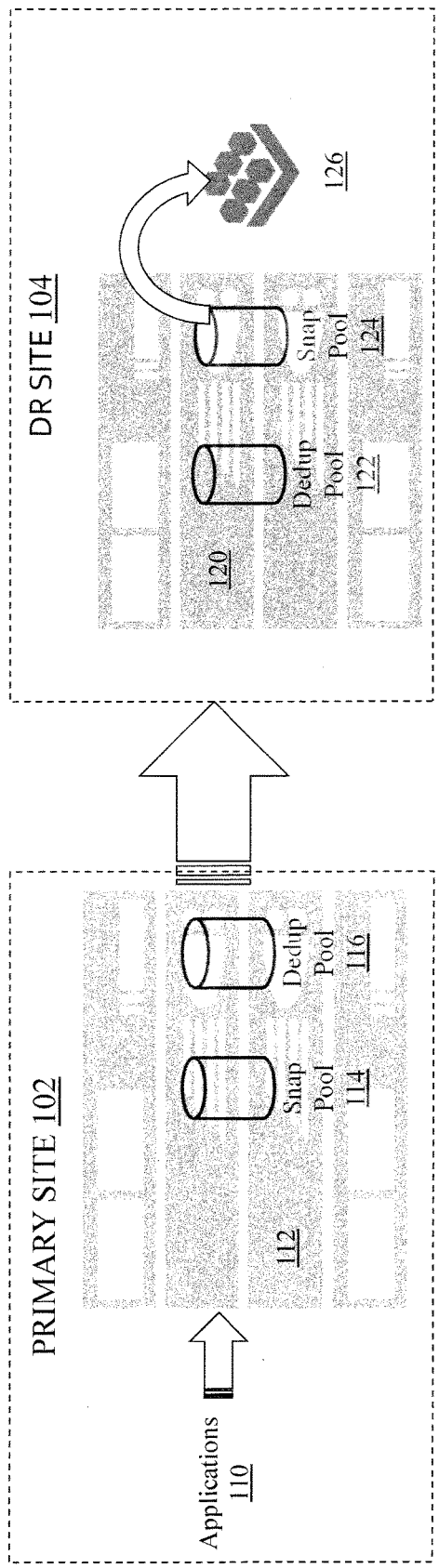
FIG. 1 is a system diagram showing the movement of snapshot data to a remote filesystem during copy data replication.

FIG. 1 is a system diagram showing the movement of snapshot data to a remote filesystem during copy data replication. FIG. 1 shows a primary site 102 and data replication site 104. Primary site 102 includes applications 110, copy data management system 112, snapshot pool 114, and dedup pool 116. Disaster recovery site 104 includes copy data management system 120, dedup pool 122, snapshot pool 124 and replicated data 126.

Primary site 102 is the location of end-user's production data and applications. There is a copy data management system 112 installed on the primary site 102. The copy data management system 112 manages 2 pools of storage:

1. snapshot pool 114: Snapshot pool 114 includes images of applications 110. The images can be associated with snapshots of the applications data taken at different points in time. A schedule for capturing snapshots of the application data can be specified by a service level agreement (SLA).

2. Dedup pool 116: Dedup pool 116 includes images from the snapshot pool 114 and are stored in a de-duplicated form.

Copy data management system 112 from the primary site 102 replicates to another copy data management system 120 which is installed in the disaster recovery site 104. Copy data management system 120 also contains a snapshot pool 124 and a de-duplication pool 122. As described above, data is de-duplicated and compressed on the primary site 102 prior to replication. Replicated data lands in the de-duplication pool 122 on the disaster recovery site 104. This data is then re-hydrated and moved to the snapshot pool 124 and applications 126 on the Disaster Recovery site 104 can then access this data.

The workflow for migrating data from primary site 102 to disaster recovery site 104 begins with data being ingested either into the snapshot pool 114 or the de-duplication pool 116 on the primary site 102. If data is ingested in the snapshot pool 114, it is moved to the de-duplication pool where it is compressed and de-duplicated. Data is then replicated from the primary site 102 to the de-duplication pool 122 on the disaster recovery site 104. From the de-duplication pool 122 on the disaster recovery site 104, data is rehydrated into the snapshot pool 124. Once data is in the snapshot pool 124, applications 126 can access this data. Additional details describing the movement of snapshot data to a remote filesystem during copy data replication can be found in U.S. application Ser. No. 12/947,385, titled "System and Method for Managing Data with Service Level Agreements That May Specify Non-Uniform Copying of Data," filed Nov. 16, 2010, the contents of which are incorporated herein in its entirety.

Figure 2:
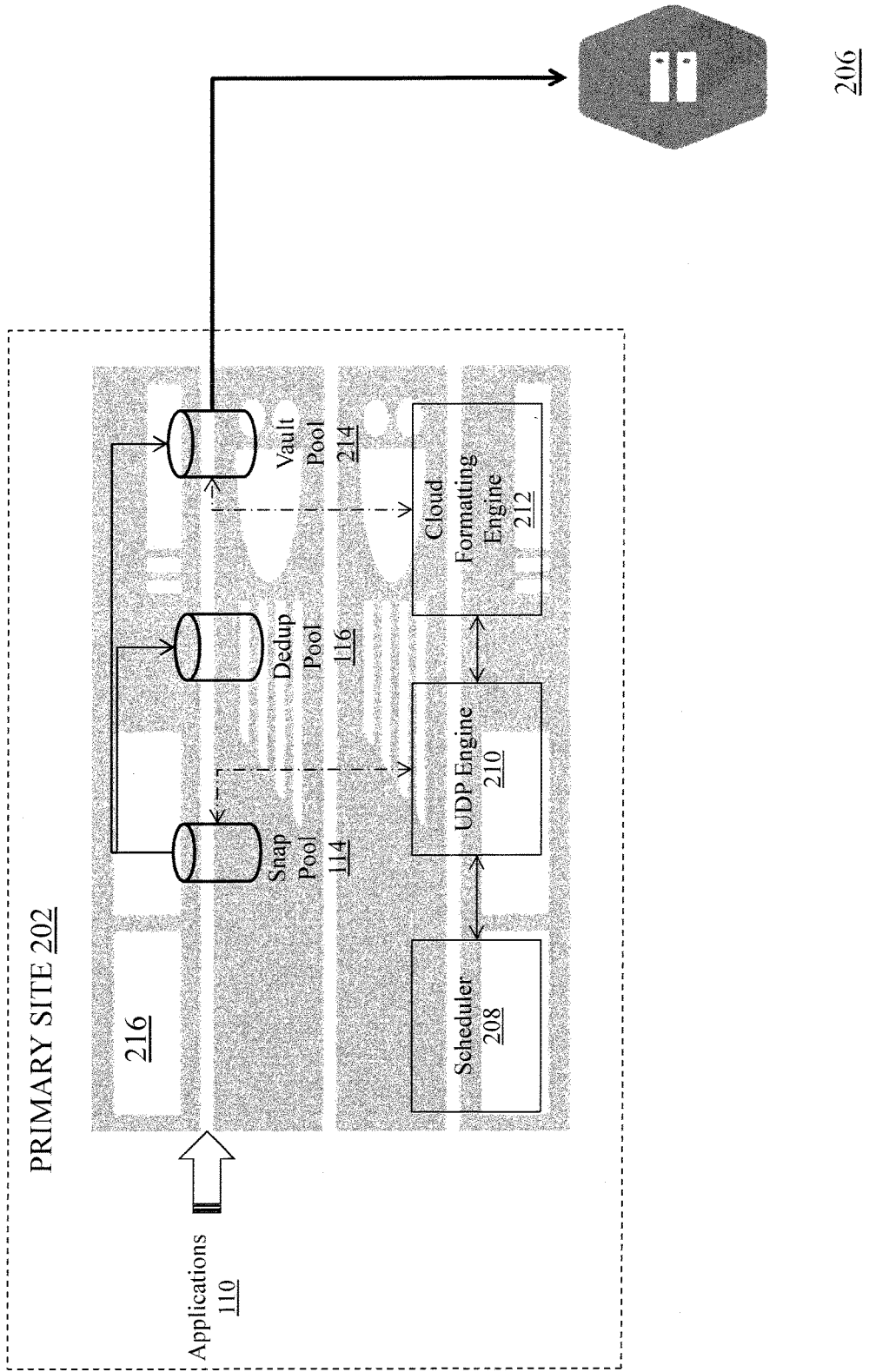
FIG. 2 is a system diagram showing the movement of snapshot data to a remote object storage during copy data replication, according to some embodiments of the present disclosure.

FIG. 2 is a system diagram showing the movement of snapshot data to a remote object storage during copy data replication, according to some embodiments of the present disclosure. FIG. 2 shows a primary site 202 and cloud object storage 206. Primary site 202 includes applications 110, copy data management system 216, snapshot pool 114, dedup pool 116, vault pool 214, scheduler 208, unified data processing (UDP) engine 210, and cloud formatting engine 212.

As described above, application 110 is being protected at copy data management system 216. The SLA for this application is configured by copy data management system 216 (also referred to herein as copy data system and copy data appliance) to vault to object store 206 (e.g., Google Nearline Object store). Copy data management system 216 moves application images from snapshot pool 114 to object store 206 per a defined application SLA. For example, the application SLA can call for periodic vaulting of these application images to object store 206.

Unified Data Processing (UDP) Engine 210, which receives instructions from a scheduler within copy data management system 216, coordinates the movement of application images snapshot pool 114 to object store 206. In some embodiments, the scheduler 208 executes jobs per policy in the copy data management system 216. Copy data management system 216 provides policy based data management for all applications. End users can create policies that govern the life cycle of a given application. The scheduler 208 provides life to this policy by actively executing tasks (also referred to herein as jobs) to ensure that applications adhere to the policies they are assigned. Vaulting data to an object store 206 can also be specified as a policy. For example, when this policy is applied to an application the scheduler 208 can ensure that the corresponding application data is vaulted to the object store 206 as specified in the policy. In addition to starting jobs to vault data to object store, the scheduler 208 can also look at the life cycle for vaulted data and expire jobs when data is past the retention period specified in a vault policy.

The UDP engine 210 is the data processing entity in the copy data management system 216. The UDP engine 210 receives input from the scheduler 208 for performing a variety of operations based on the source and target of the application being manipulated. For example, UDP engine 210 can receive instructions to vault data into an object store from scheduler 208. UDP engine 210 orchestrates this data movement by invoking (e.g., sending instructions to) the cloud formatting engine 212 to perform the actual data movement. The UDP engine 210 also generates the metadata for this data movement that it persists after completion. Upon completion, the UDP engine 210 then informs the scheduler which then re-schedules this job for the next run. Specifically, the UDP engine 210 sends an instruction to the cloud formatting engine 212 to mount the object store as a local file-system. UDP engine 210 then initiates the data copy into the object store by copying the source data (located in the snapshot pool 114) to the mount point. The cloud formatting engine 212 in turn moves this data to the object store, optimizing the writes for the best performance. In some embodiments, writes are performed at a 64K boundary using a method that by-passes file-system caching (e.g., O_DIRECT). Using O_DIRECT, for example, also avoids a typical read-modify-write scenario where a partial block write needs to fetch data from the disk modify it and then rewrite it back to disk. The effect of these partial-block writes can be many orders of magnitude worse when writing to cloud storage as the initial fetch of the block of data happens from the object store, which can be a high latency operation. Using O_DIRECT, for example, can have dramatic performance improvements in a vault job performance. In some embodiments, increased and sustained network utilization can be required for optimal performance.

The Unified Data Processing (UDP) Engine 210 receives data associated with an instruction from scheduler 208 in the copy data system 216 to move data between various tiers of storage (e.g., snap pool 114, dedup pool 116, vault pool 214). Copy data system 216 has 3 tiers of storage—

1. Snapshot Storage Pool 114—In some embodiments, this is the highest performing storage tier under management of the copy data management system 216. Data is typically moved from production storage, which is associated with applications 110, to snapshot pool 114. In some embodiments, snapshot pool 114 is the first storage tier where copy data is created.
2. De-duplication Pool 116—In some embodiments, this tier of storage is used for medium term (e.g., read every 3-6 months) data retention. Data is typically moved from snapshot pool 114 to the de-duplication pool 116. Copy data system 216 can provide global de-duplication across all applications data under management.
3. Vault Pool 214—In some embodiments, this tier of storage is for long-term (e.g., read 1-7 every years) data retention. Vault pool 214 a logical entity in copy data system 216 and can be backed by a public or private object store.

As described above, UDP engine 210 supports vault jobs. In some embodiments, vault jobs move data from snapshot pool 114 to vault pool 214, thus moving data to object stores for long term retention. UDP engine 210 can also manage clone and mount jobs that provide end users access to data in object store. Clone jobs can move entire data sets from object store 206 to snapshot pool 114 while mount jobs provide instant (or near instant) access to data on object stores 206. Instant access as referred to herein refers to near instant access and is associated with certain times as described in more detail below. As part of life-cycle management, UDP engine 210 can also expire jobs from object store 206 when the data has reached its retention.

Object store 206 is logically presented to copy data management system 216 as vault pool 214. The vault pool 214 is a logical representation of the cloud based object store 206. Unlike the snap pool 114 or the dedup pool 116 copy data management system 216 does not actively manage this storage. Vault pool 214 is a logical representation of the remote cloud object store that the cloud formatting engine 212 presents as a local data store. In some embodiments, an end user can have multiple vault pools each represented by a different cloud based object store.

Cloud formatting engine 212 presents a disk like block storage interface for object store 206. In some embodiments, cloud formatting engine 212 is a file system in user space (FUSE) based program and presents a logical disk interface to an object store back-end 206. Filesystem in Userspace (FUSE) is a software interface for Unix-like computer operating systems that lets non-privileged users create their own file systems without editing kernel code. This is achieved by running file system code in user space while the FUSE module provides only a bridge to the actual kernel interfaces. FUSE is particularly useful for writing virtual file systems. Unlike traditional file systems that essentially save data to and retrieve data from disk, virtual filesystems do not actually store data themselves. They act as a view or translation of an existing file system or storage device.

In some embodiments, any resource available to a FUSE implementation can be exported as a file system. Cloud formatting engine 212 transfers data to object stores, keeping a catalog of objects in the object store and also provides the capability to mount data for instance access from the object store (e.g., S3Backer that interfaces to Amazon Web Services' (AWS) object store S3). In some embodiments, cloud formatting engine 212 also includes a block naming scheme for an object store (e.g., AWS). To avoid metadata processing hotspots associated with an object store, in some embodiments, consecutive block IDs do not translate to object names with common prefixes. In some embodiments, the cloud formatting engine 212 includes an asynchronous option of filling out a non-zero block bitmap (used to optimize out reads/writes of zero-filled blocks). This allows for a local device to store incremental changes to a bucket on a local block device while leaving a cloud data set immutable. With this enhancement, cloud data can be presented as a read-writeable mount to a host. All writes coming from a host will be sent to the local device thus leaving the cloud data unchanged. Data in the object store, which is often used for long term retention, can be immutable thereby leaving the archive copy untouched for compliance purposes.

In some embodiments, cloud formatting engine 212 includes error handling to recognize error types that do not need retries and a storing bucket configuration (e.g., block size, dataset size, compression/encryption settings (on/off), etc.) in the cloud to minimize (critical) mistakes leading to the loss of data. In some embodiments, cloud formatting engine 212 includes an authentication mechanism that performs authentication using native security APIs from other vendors (e.g., Google Nearline's native security APIs). Including this authentication mechanism allows the copy data management system 216 to work with object stores from different vendors (e.g., Google Nearline, which is Google's public object store). In some embodiments, cloud formatting engine 212 can talk to multiple object store providers like Google, Microsoft Azure etc. In some embodiments, cloud formatting engine 212 includes a separate authentication layer to authenticate with native APIs from a plurality of different vendors. The authentication layer includes authentication modules that are specialized for various storage backends. In some embodiments, the cloud formatting engine 212 includes a security module with new interfaces that can take a generic set of parameters as deemed necessary by an object store vendor cloud formatting engine is writing to. The parameters can be customized per a cloud provider's requirements. For example, the parameters can include bucket-name, access-id and access-key for an Amazon S3 Backer and a bucket-name P12 certificate for Google.

For moving data to object storage 206, UDP engine 210 creates vault application images on the disk presented by cloud formatting engine 212. Cloud formatting engine 212 in turn converts this application image to objects and dispatches them to the object store 206 as configured by the SLA. UDP engine 210 interacts with cloud formatting engine 212 and moves application data 110 to the vault pool 214. As described above, vault pool 214 is a logical end point for the cloud storage 206 presented by cloud formatting engine 212. Cloud formatting engine 212 in turn moves this data to the object store 206 as specified in the policy. The end user configures a vault pool 214 on a user interface, which is shown and described in more detail below. The vault pool 214 is backed by an object store of the user's choice. As part of the configuration the end user also configures the storage entity and the access controls for the object store. Copy data management system 112 validates the access controls as part of initializing the vault pool 214. Once initialized the vault pool is ready for use. Once created, vault pool 214 can be used as a resource in any SLA template. The applications that are governed by this template can vault data to the vault pool 214 that is specified. The UDP engine 210 creates a directory structure on the local appliance that serves as a logical representation of the object store. In some embodiments, the directory structure is created under the/("root") partition and an application's ID is used as a sub-directory where the vault images are created. Each vault image is given a unique name that is unique in the global namespace of all images in that object store. Appliance ID, application ID, backup-image ID and a time-stamp make up the unique application ID for a given image. This directory structure is then passed to cloud formatting engine 212 for it to use as a logical end point of the object store. This logical end-point is the mount point for the image that is stored in the object store 206. The image actually is not located in the directory but is mounted to a location specified by the directory. This establishes the link where any file transferred to that end point is automatically sent to the object store that is backed by the end point. Vaulting jobs run by the UDP engine 210 involves copying the data to the logical end point at which point cloud formatting engine 212 automatically moves this data to the object store backing this logical end point.

In some embodiments, each image that is vaulted can be assigned a specific prefix or identifier to easily find it in the object store. The prefix helps the object store index these images efficiently for faster access. The index assigned to each vault image is also stored in metadata. In some embodiments, data stored in the object store is split into one or more small object files such that every volume stored in the object store is given a unique prefix. Copy data management system 216 protects application data along with its associated metadata when moving data from the snapshot pool to vault pool 214. The metadata object describes the application data and can be used to restore this application data. For file-system data, the metadata describes the file-system type and options to mount the file-system. For database applications such as SQL and Oracle, metadata can contain the database name and configuration data to recover the database. In some embodiments, metadata is stored as an object in the vault object store. A special object name ("metadata") can be used as prefix for the metadata objects. Metadata can also include information about data volumes.

Figure 3:
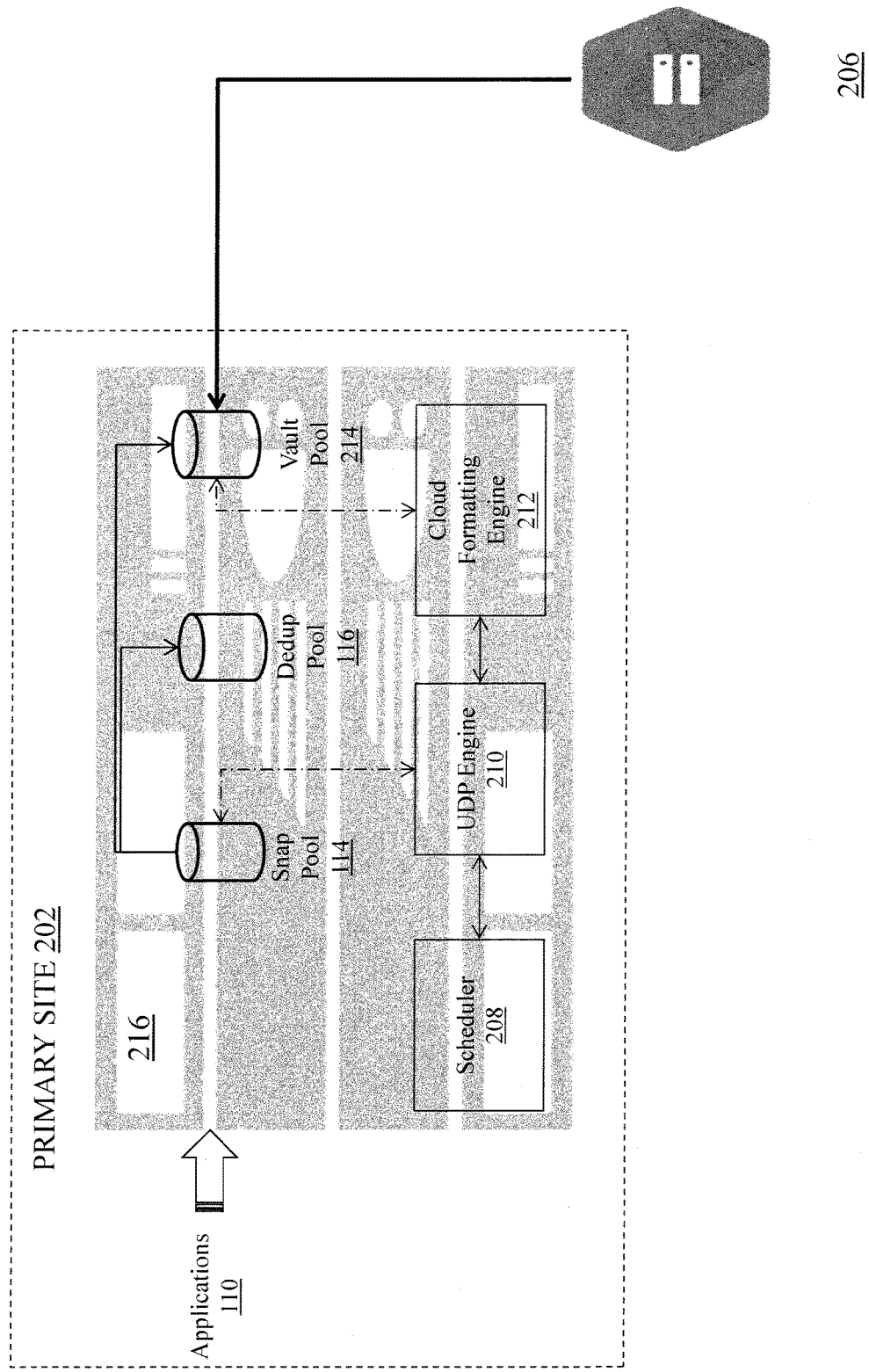
FIG. 3 is a system diagram showing a mount of application images from an object store, according to some embodiments of the present disclosure.

FIG. 3 is a system diagram showing a mount of application images from an object store, according to some embodiments of the present disclosure. FIG. 3 shows similar elements as FIG. 2, which operate in a similar fashion as described above.

Once an application 110 has been vaulted to an object store 206, copy data management system 216, enables a mount of that image with very limited data movement. An advantage to mounting with limited data movement is nearly instant access to data stored at the object store 206. A mount is initiated when the end-user wants a second or an older copy of application data 110 that has been moved to object store 206. As described in more detail below, in some embodiments, UDP engine 210 receives an instruction associated with a user request through a user interface to present a volume of data as a disk to a specified host. The UDP engine 210 in copy data appliance 216 looks up in its metadata and determines that the image being asked for has been vaulted to the object store 1009. The UDP engine 210 also fetches from the metadata the prefix associated with this image. The UDP engine 210 then invokes cloud formatting engine 212 with the image name and prefix and sends instructions to the cloud formatting engine 212 with a request to present a logical mount of this image to a logical end point in the vault pool 214 on the appliance that represents remote object store 206. Copy data management system 216 then makes a logical mount of that application image as a disk on itself and then presents that disk via a local-area or wide-area network (e.g., iSCSI) to the application requesting the mount. UDP engine 210 can also present a scratch device to this mount to cache all the writes that come from the host. In some embodiments, the writes are cached and saved until the host holds on to the mount. These writes and the scratch disk itself are discarded once the host releases the mount using the un-mount operation.

As discussed above, near instant access as described herein can be associated with certain timings. For example, the time associated with cloud formatting engine 212 completing the request to mount a volume from the object store can be approximately one minute or less (e.g., 5-60 seconds). The time associated with presenting the disk can be approximately a few seconds (e.g., 1-10 seconds). The time associated with processing metadata can be approximately a few seconds (e.g., 30-60 seconds). As a result, the total time associated with a user requesting a copy of application data at an object store to the time the requested data is mounted at the specified host can be approximately 2 minutes. As described above, since there is very limited data movement associated with the mount, the time for mounting data of any size, be it a few megabyte file or a few terabyte file is the same.

Figure 4:
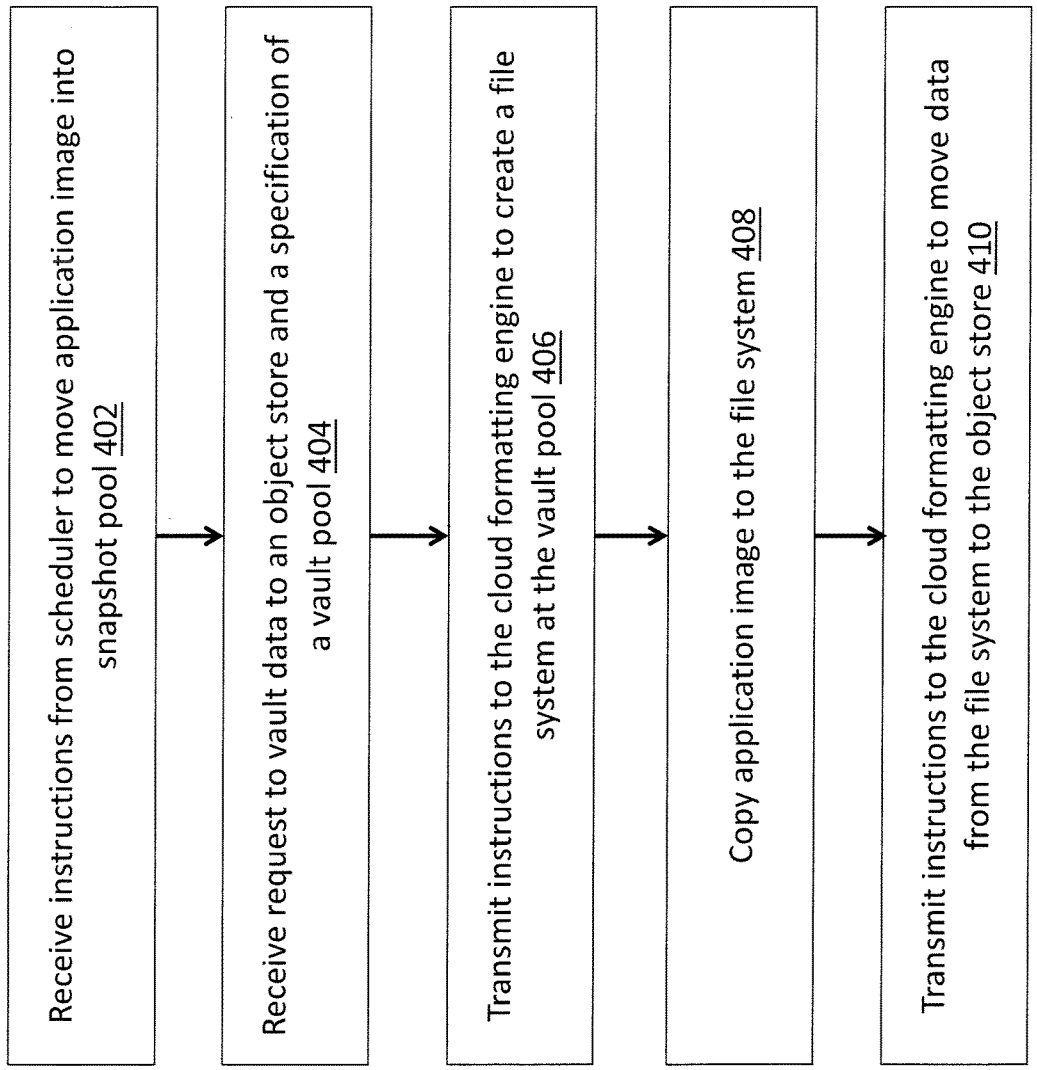
FIG. 4 is a flowchart illustrating techniques for backing up an image to object storage, according to some embodiments of the present disclosure.

FIG. 4 is a flowchart illustrating techniques for backing up an image to object storage, according to some embodiments of the present disclosure.

UDP engine 210 receives instructions from scheduler 208 to move application images into the snapshot pool 114 per a configured SLA 402. As described above, an SLA can specify a schedule for taking snapshots of application data (e.g., once every hour, once a day, once a week). Next, UDP engine 210 receives a request to vault application data 404. The request includes a specification of a vault pool. After receiving the request and a specification of a vault pool, UDP engine 210 sends an instruction to cloud formatting engine to create a logical file-system at the specified vault pool representing the object store 214 406. The application image is then copied to the file-system at the vault pool 408. Cloud formatting engine 212, which manages the vault pool, in turn moves this data into the backing object store 206 406. UDP engine catalogues the stored application images in a job catalog database.

Figure 5:
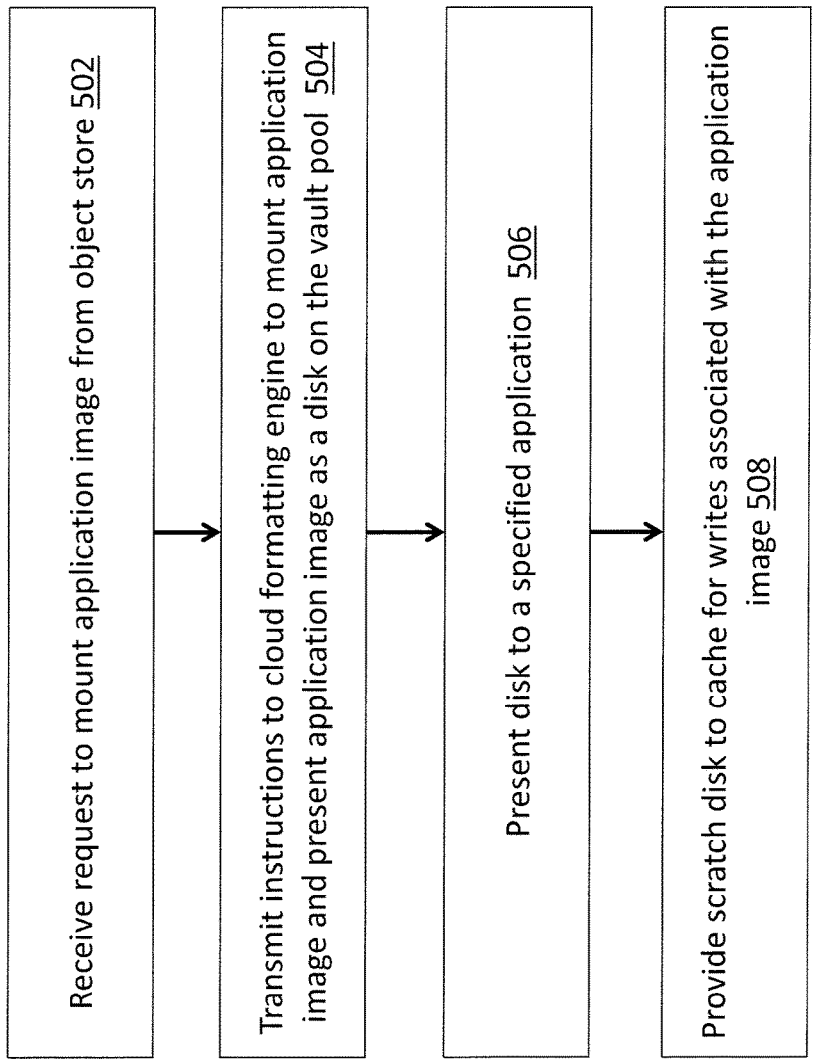
FIG. 5 is a flowchart illustrating techniques for mounting an image from object storage, according to some embodiments of the present disclosure.

FIG. 5 is a flowchart illustrating techniques for mounting an image from object storage, according to some embodiments of the present disclosure.

When an end-user requests a mount of an application image at object store 502, UDP engine 210 invokes cloud formatting engine 212 to mount that image logically on the vault pool 214 504. Cloud backer 212 looks up the application image and presents it as a disk on the vault pool 214. UDP engine 210 then presents this disk to an application (specified by the end-user) via the iSCSI protocol 506. UDP engine 210 also provides a scratch disk to cache all the writes coming to this image. Most operating systems require writing header and drive information to any disk they are mounting. Microsoft Windows, for instance, assigns drive letters to mounts, and Linux assigns IDs to drives such that the drives are unique in the system. Disks that are mounted read-only require supporting small amount of metadata writes. Vault jobs, in contrast, write to object stores and the primary intent for long term data retention is to ensure that the written data is immutable. In some embodiments, when mounting data from object stores, copy data appliance also provides a thin provisioned disk (referred to herein as a scratch disk) to support small metadata writes. The scratch disk buffers all the writes that come to the mounted disk (from the object store). This provides an application the ability to write metadata and for copy data appliance the ability to keep the data in the object store intact. Because the data in the vault can be immutable, in some embodiments, the writes to the scratch disk are discarded upon unmount.

Figure 6:
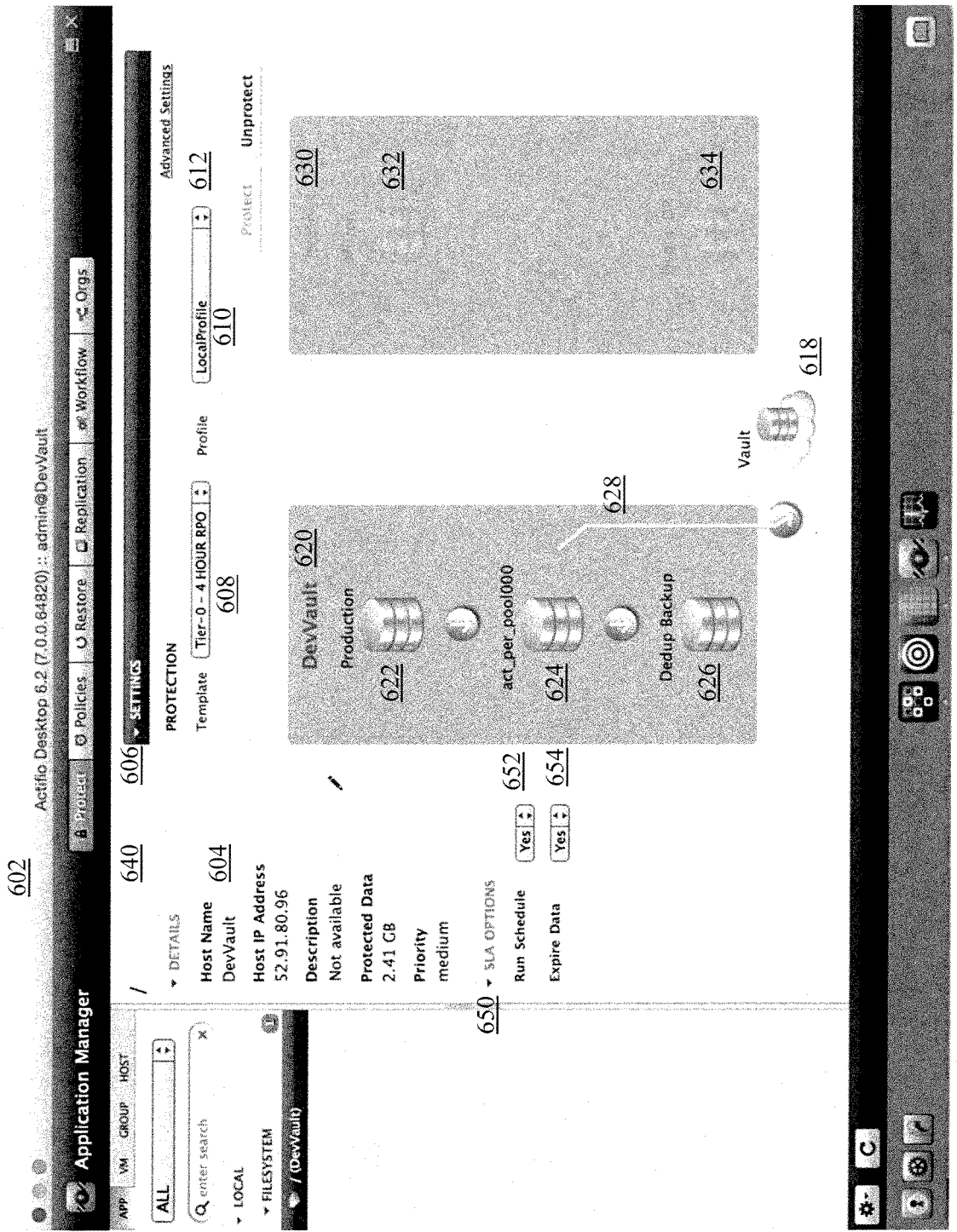
FIG. 6 is a screenshot showing assigning a service level agreement to an application, according to some embodiments of the present disclosure.

FIG. 6 is a screenshot showing assigning a service level agreement to an application, according to some embodiments of the present disclosure. FIG. 6 shows SLA configuration on a desktop 602 that is the user interface to configure and manage a copy data management system as described herein. Desktop 602 includes data management tabs 640 to manage various aspects of application data life cycle. Application section 650 describes hosts and associated applications under management. Details section 604 include details specific to an application residing on a host and the associated policy. Settings section 606 shows the details of the policy when applied to an application. The details section 604 provides information on the host that is hosting the application that is under management. It provides the hostname, IP address and the application size as discovered by copy data management system. It also provides overrides to disable this application from being scheduled 652 and from scheduler running any expiration jobs that delete copies older than what is in the retention part of the policy 654. These overrides are in place so a policy can be altered temporarily either due to a change in requirements or for troubleshooting problems.

Data management tabs 640 include a protect tab, a policies tab, a restore tab, a replication tab, a workflow tab, and an organization tab. Protect tab, as shown in FIG. 6 manages data protection aspects which includes how often data is protected and how long it is kept in the various storage tiers (snapshot pool 624, dedup pool 626 and vault pool 618). The protection tab also describes how often data is moved from snapshot to dedup and snapshot to vault pools.

Policy tab allows changing the above mentioned time intervals for protection and data lifecycle management. Restore tab is used to present data back to a host via a mount or by actually moving data to the host. For data vaulted to object stores, copy data appliance presents two options, clone to bring data back from the object store and mount which provides instant (or near instant) access to data in the object store. The replication tab indicates details on which another appliance is connected to the appliance illustrated in FIG. 6 and how data replication is progressing between appliances. As shown in the FIG. 6, 630, 632 and 634 represent application (630), snapshot (632) and de-duplication (634) pools on one remote copy data appliance. The storage pools that are on the remote appliance 630 include the production storage 632 and a deduplication pool 634. Orgs tab presents users and roles to manage various aspects of the appliance. An admin role will have access to everything and the admin user can create other roles that restrict access to some portions of the appliance.

The setting tab 606 includes a template feature 608, a local profile feature 610 and a protect/unprotect feature 612. The SLA template feature 608 allows a user to specify an SLA template that can vault data from the snapshot pool 624. The Vault Policy 628 controls how often images are sent to the vault pool 618. The vault policy 628 includes specification of a schedule that dictates how often the scheduler begins vault jobs. The vault policy 628 also indicates the resource (also referred to herein as object store) that is used by the vaulting jobs. The template 608 specifies which Service Level Agreement to use for vaulting data to object store 628. Vault Policy 628 also manages the lifecycle of the images in the object store (not shown).

The template 610 in FIG. 6 shows the SLA template that is governing the application 650. The SLA template controls when data is moved to snapshot pool 624 from application storage 622, de-duplication pool 626 and to Vault Pool 618. The profile 612 indicates which resources are to be used by this policy, primarily which snapshot pool 624 and which Vault pool 618.

Figure 7:
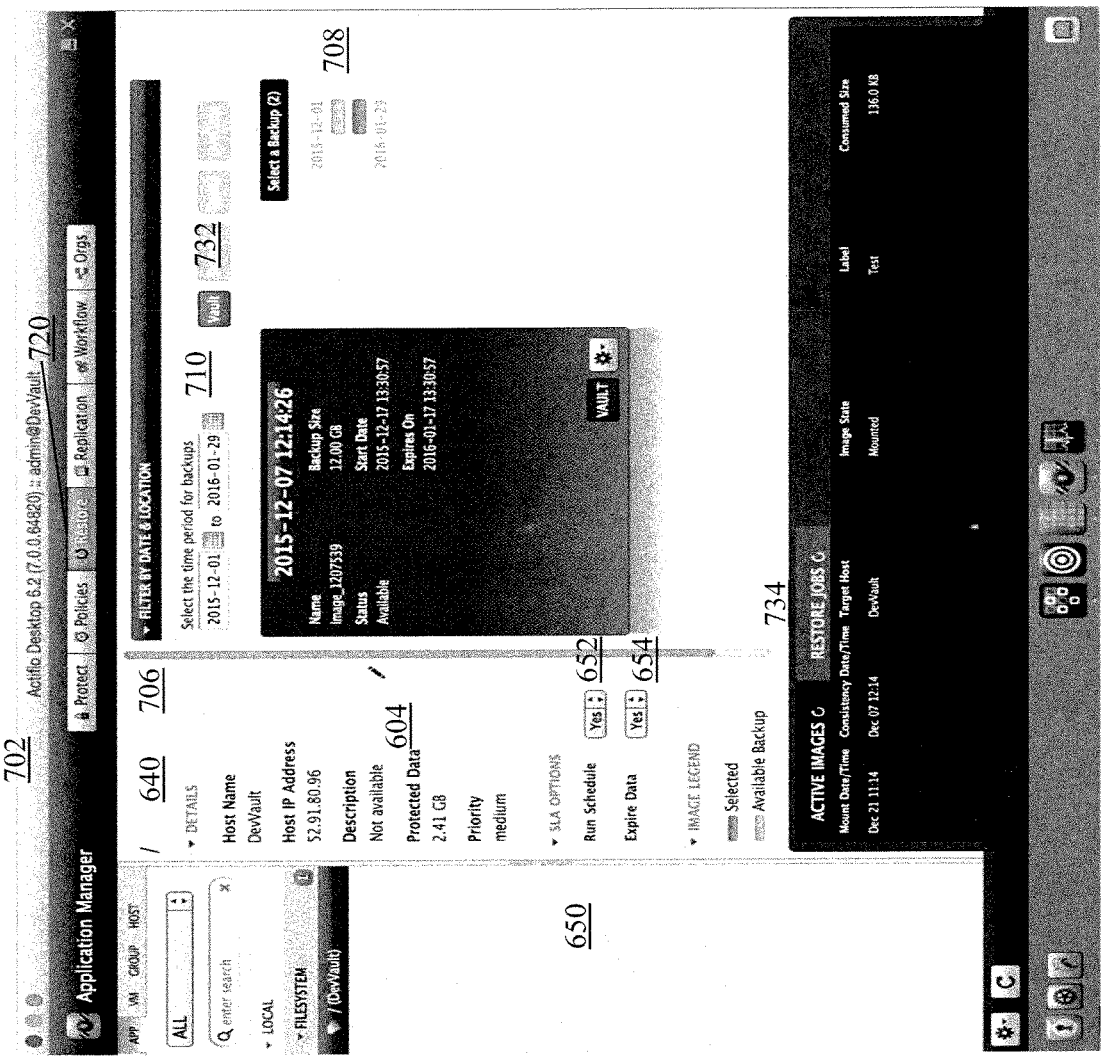
FIG. 7 is a screenshot of a desktop showing the restore tab, according to some embodiments of the present disclosure.

Once an SLA template with Vaulting as a component is created it can be applied to applications discovered and managed by the data management appliance. As shown in FIG. 7 an application is being protected by a template that has vaulting as a component.

FIG. 7 is a screenshot of a desktop 702 showing the restore tab, according to some embodiments of the present disclosure. The restore tab 720 allows a user to restore or mount data that is being managed by a copy data management appliance. The other tabs in 702 are described above with respect to FIG. 6. The restore tab 720 shows applications in various tiers of storage (e.g., snapshot, dedup and also vault 732). End user can click on any image in the vault tab and ask for that image to be restored or mounted. If the image is to be restored, UDP engine invokes the cloud formatting engine requesting the image data to be mounted and then copies the image from the logical end point of the vault pool to the snapshot pool. If the image is to be mounted, UDP engine invokes cloud formatting engine to request that the image data be mounted and then presents this mount point as an iSCSI target to the client machine.

Along with the various tiers of storage 732, user can also select a time-range to view list of available images 708 in that time-window. The list 708 is adjusted per the tier of storage 732 and the time range 710.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of enabling a service level agreement to specify interactions between an application and a remotely located object store that manages data as objects, the computerized method comprising:
   receiving, by a computing device, first data associated with a first request to write application data to an object store according to a first schedule, wherein the first data is file system data;
   creating, by the computing device, a first snapshot associated with the first requested application at a snapshot pool at a primary site;
   creating, by the computing device, first metadata associated with the first snapshot, the first metadata comprising an application type including at least one of a file-system type and a database type;
   transmitting, by the computing device, first instructions to a cloud formatting engine to create a first virtual disk at a storage pool at the primary site associated with an object store separate from the primary site, the first disk being structured to accept file system data;
   copying, by the computing device, the first snapshot from the snapshot pool to the first virtual disk, the first snapshot comprising file system data;
   transmitting, by the computing device, instructions to the cloud formatting engine to:
      convert the copied snapshot on the virtual disk into an object, and
      move the converted object from the first virtual disk to the object store; and
   storing, by the computing device, the first metadata at the primary site separate from the object on the object store;
   thereby enabling a service level agreement to specify interactions between an application and a remotely located object store that manages data as objects.

2. The computerized method of claim 1, further comprising:
   receiving, by the computing device, second data associated with a second request from a requesting application to read application data from the object store at a first time;
   transmitting, by the computing device, second instructions to the cloud formatting engine to:
      mount a second snapshot, the snapshot associated with the second data, and
      present the second snapshot as a second virtual disk on the storage pool associated with the object store; and
   presenting, by the computing device, the second virtual disk to the requesting application at a second time.

3. The computerized method of claim 2, further comprising:
   providing, by the computing device, a scratch disk to cache writes associated with the second snapshot, the cache writes including identification information associated with the second snapshot.

4. The computerized method of claim 2, wherein a difference between the first time and the second time is approximately 2 minutes.

5. The computerized method of claim 1, wherein the object store is associated with a long-term storage of the application data.

6. The computerized method of claim 1, further comprising creating, by the computing device, a directory structure associated with the object store, the directory structure comprising a logical representation of the object store.

7. The computerized method of claim 6, wherein the first instructions include data associated with the directory structure.

8. A computerized system for enabling a service level agreement to specify interactions between an application and a remotely located object store that manages data as objects, comprising a processor configured to run a module stored in memory that is configured to cause the processor to:
receive first data associated with a first request to write application data to an object store separate from a primary site according to a first schedule, wherein the first data is file system data;
create a first snapshot associated with the first requested application at a snapshot pool at the primary site;
create, by the computing device, first metadata associated with the first snapshot, the first metadata comprising an application type including at least one of a file-system type and a database type;
transmit first instructions to a cloud formatting engine to create a first virtual disk at a storage pool at the primary site associated with an object store, the first disk being structured to accept file system data;
copy the first snapshot from the snapshot pool to the first virtual disk, the first snapshot comprising file system data;
transmit instructions to the cloud formatting engine to:
convert the copied snapshot on the virtual disk into an object, and
move the converted object from the first virtual disk to the object store; and
storing, by the computing device, the first metadata at the primary site separate from the object on the object store;
thereby enabling a service level agreement to specify interactions between an application and a remotely located object store that manages data as objects.

9. The computerized system of claim 8, wherein the processor is further caused to:
receive second data associated with a second request from a requesting application to read application data from the object store at a first time;
transmit second instructions to the cloud formatting engine to:
mount a second snapshot, the snapshot associated with the second data, and
present the second snapshot as a second virtual disk on the storage pool associated with the object store; and
present the second virtual disk to the requesting application at a second time.

10. The computerized system of claim 9, wherein the processor is further caused to:
provide a scratch disk to cache writes associated with the second snapshot, the cache writes including identification information associated with the second snapshot.

11. The computerized system of claim 9, wherein a difference between the first time and the second time is approximately 2 minutes.

12. The computerized system of claim 8, wherein the object store is associated with a long-term storage of the application data.

13. The computerized system of claim 8, wherein the processor is further caused to create a directory structure associated with the object store, the directory structure comprising a logical representation of the object store.

14. The computerized method of claim 13, wherein the first instructions include data associated with the directory structure.

15. A non-transitory computer readable medium having executable instructions operable to cause an apparatus to:
receive first data associated with a first request to write application data to an object store separate from a primary site according to a first schedule, wherein the first data is file system data;
create a first snapshot associated with the first requested application at a snapshot pool at the primary site;
create, by the computing device, first metadata associated with the first snapshot, the first metadata comprising an application type including at least one of a file-system type and a database type;
transmit first instructions to a cloud formatting engine to create a first virtual disk at a storage pool at the primary site associated with an object store, the first disk being structured to accept file system data;
copy the first snapshot from the snapshot pool to the first virtual disk, the first snapshot comprising file system data;
transmit instructions to the cloud formatting engine to:
convert the copied snapshot on the virtual disk into an object, and
move the converted object from the first virtual disk to the object store; and
storing, by the computing device, the first metadata at the primary site separate from the object on the object store;
thereby enabling a service level agreement to specify interactions between an application and a remotely located object store that manages data as objects.

16. The non-transitory computer readable medium of claim 15, wherein the apparatus is further caused to:
receive second data associated with a second request from a requesting application to read application data from the object store at a first time;
transmit second instructions to the cloud formatting engine to:
mount a second snapshot, the snapshot associated with the second data, and
present the second application image as a second virtual disk on the storage pool associated with the object store; and
present the second virtual disk to the requesting application at a second time.

17. The non-transitory computer readable medium of claim 16, wherein the apparatus is further caused to:
provide a scratch disk to cache writes associated with the second snapshot, the cache writes including identification information associated with the second snapshot.

18. The non-transitory computer readable medium of claim 16, wherein a difference between the first time and the second time is approximately 2 minutes.

19. The non-transitory computer readable medium of claim 15, wherein the object store is associated with a long-term storage of the application data.

20. The non-transitory computer readable medium of claim 15, wherein the apparatus is further caused to create a directory structure associated with the object store, the directory structure comprising a logical representation of the object store.

* * * * *